United States Patent
Malkamaki et al.

(10) Patent No.: US 9,281,922 B2
(45) Date of Patent: Mar. 8, 2016

(54) DATA INDICATOR FOR PERSISTENTLY ALLOCATED PACKETS IN A COMMUNICATIONS SYSTEM

(75) Inventors: Esa Mikael Malkamaki, Espoo (FI); Jussi Kustaa Ojala, Helsinki (FI)

(73) Assignee: Nokia Corporation, Espoo (FI)

( * ) Notice: Subject to any disclaimer, the term of this patent is extended or adjusted under 35 U.S.C. 154(b) by 196 days.

(21) Appl. No.: 12/672,229

(22) PCT Filed: Mar. 18, 2009

(86) PCT No.: PCT/IB2009/000554
§ 371 (c)(1),
(2), (4) Date: Feb. 4, 2010

(87) PCT Pub. No.: WO2009/115904
PCT Pub. Date: Sep. 24, 2009

(65) Prior Publication Data
US 2011/0182245 A1    Jul. 28, 2011

Related U.S. Application Data

(60) Provisional application No. 61/038,330, filed on Mar. 20, 2008.

(51) Int. Cl.
*H04L 1/18* (2006.01)
*H04W 72/04* (2009.01)
*H04W 72/12* (2009.01)

(52) U.S. Cl.
CPC ............ *H04L 1/1812* (2013.01); *H04L 1/1854* (2013.01); *H04W 72/04* (2013.01); *H04W 72/12* (2013.01)

(58) Field of Classification Search
None
See application file for complete search history.

(56) References Cited

U.S. PATENT DOCUMENTS

| | | |
|---|---|---|
| 2003/0123347 A1 | 7/2003 | Saito |
| 2003/0210668 A1 | 11/2003 | Malladi et al. |

(Continued)

FOREIGN PATENT DOCUMENTS

| | | |
|---|---|---|
| EP | 2015602 A1 | 1/2009 |
| WO | 2008804493 A2 | 4/2008 |

(Continued)

OTHER PUBLICATIONS

J. Puttonen, N. Kolehmainen, T. Henttonen, M. Moisio, Persistent Packet Scheduling Performance for Voice-Over-IP in Evolved UTRAN Downlink, Personal, Indoor and Mobile Radio Communications, 2008 PIMRC 2008, IEE 19th International Symposium, Sep. 15-18, 2008, p. 1-6.

(Continued)

*Primary Examiner* — Mohammad Adhami
(74) *Attorney, Agent, or Firm* — Harrington & Smith

(57) ABSTRACT

An apparatus 310 employable in a communication system configured to determine a value for a new data indicator for semi-persistently allocated or scheduled resources. In one embodiment, the apparatus 310 includes a processor 320 configured to receive a cell radio network temporary identifier indicating a semi-persistent scheduling. The processor 320 is also configured to treat a reception of data with a new data indicator flag in accordance with the semi-persistent scheduling as one of a persistent initial transmission if a value of the new data indicator flag is equal to a first predefined value, and a retransmission of semi-persistent scheduling data if the value of the new data indicator flag is equal to a second predefined value.

17 Claims, 9 Drawing Sheets

(56) References Cited

U.S. PATENT DOCUMENTS

| | | | |
|---|---|---|---|
| 2007/0115894 A1* | 5/2007 | Herrmann et al. | 370/338 |
| 2007/0291688 A1* | 12/2007 | Jiang et al. | 370/328 |
| 2008/0081651 A1* | 4/2008 | Kuroda et al. | 455/509 |
| 2008/0228878 A1* | 9/2008 | Wu et al. | 709/205 |
| 2009/0207794 A1* | 8/2009 | Meylan | 370/329 |
| 2009/0257385 A1* | 10/2009 | Meylan et al. | 370/329 |
| 2010/0248765 A1* | 9/2010 | Chun et al. | 455/509 |
| 2010/0296454 A1* | 11/2010 | Park et al. | 370/328 |
| 2011/0194502 A1* | 8/2011 | Sung et al. | 370/329 |

FOREIGN PATENT DOCUMENTS

| | | |
|---|---|---|
| WO | 2008096259 A2 | 8/2008 |
| WO | 2008111795 A2 | 9/2008 |
| WO | 2008114222 A2 | 9/2008 |
| WO | 2008153461 A1 | 12/2008 |
| WO | WO 2009/025525 | 2/2009 |

OTHER PUBLICATIONS

F. Persson, Voice Over IP Realized for the 3GPP Long Term Evolution, Vehicular Technology Conference, 2007 VTC-2007 IEEE 66th Volume, Issue, Sep. 30 2007-Oct. 3, 2007, pp. 1436-1440.

International Search Report and Written Opinion Issued by the International Bureau on Sep. 25, 2009, pp. 1-17.

3GPP TS 36.300 V8.4.0 (Mar. 2008), 3rd Generation Partnership Project; Technical Specification Group Radio Access, Network; Evolved Universal Terrestrial Radio Access (E-Utra) and Evolved universal Terrestrial Radio Access Network. Stage 2, Release 8, p. 1-126.

3GPP TS 36.321 V8.1.0 (Mar. 2008) 3rd Generation Partnership Project; Technical Specification Group Radio Access, Network; Evolved Universal Terrestrial Radio Access (E-UTRA) Medium Access Control (MAC) Protocol Specification (Release 8), p. 1-30.

Samsung, C-RNTI and NDI for SPS, 3GPP TSG-RAN2#63 meeting, Jeju, South Korea, Aug. 18-22, 2008, p. 1-4.

LG Electronics, Re-Transmission of Persistent Scheduling,3GPP TSG-RAN WG2 #61, Feb. 11-15, 2008, Sorrento, Italy, p. 1-4.

Email Rapporeur, Discrimination of Semi Persistent and Dynamic PDCCH Commands, 3GPP TSG-RAN WG2 #61bis, Shenzhen, China, Mar. 31-Apr. 4, 2008, 1-6.

3GPP TSG-RAN WG1 Meeting #52; R1-081138; *LS reply on NDI vs. RV*; Sorrento, Italy, Feb. 11-15, 2008 (1 page ).

3GPP TSG-RAN WG2 #56bis; Tdoc R2-070057; Sorrento, Italy, Jan. 15-19, 2007; Update of R2-062335; Agenda Item: 5.9; Source: Ericsson; Title: NDI-less HARQ operation (6 pages).

* cited by examiner

DATA INDICATOR FOR PERSISTENTLY ALLOCATED PACKETS IN A COMMUNICATIONS SYSTEM

RELATED APPLICATION

This application was originally filed as PCT Application No. PCT/IB2009/000554 on Mar. 18, 2009 and claims priority to U.S. Provisional Application No. 61/038,330 filed on Mar. 20, 2008, which is incorporated herein by reference in its entirety.

TECHNICAL FIELD

The present invention is directed, in general, to communication systems and, more particularly, to an apparatus, system, and method to signal indication of new data for semi-persistently or persistently allocated transmission resources in a wireless communication system.

BACKGROUND

As wireless communication systems such as cellular telephone, satellite, and microwave communication systems become widely deployed and continue to attract a growing number of users, there is a pressing need to accommodate a large and variable number of communication devices transmitting a growing volume of data over wide cellular areas with fixed resources. Traditional communication system designs have become challenged to provide reliable communication over a reasonably wide geographical area in view of the general need to limit transmitter power and bandwidth for the rapidly growing customer base and expanding levels of service.

The Third Generation Partnership Project Long Term Evolution ("3GPP LTE") project is the name generally used to describe an ongoing effort across the industry to improve the universal mobile telecommunications system ("UMTS") for mobile communication to cope with continuing new requirements and the growing base of users. The goals of this broadly based project include improving communication efficiency, lowering costs, improving services, making use of new spectrum opportunities, and achieving better integration with other open standards. The 3GPP LTE project is not by itself a standard-generating effort, but will result in new recommendations for standards for the UMTS.

In wireless communication systems where control channel resources are limited, various techniques to optimize utilization of control channel resources have been considered. One optimization technique utilizes persistent or semi-persistent allocation of transmission resources assigned to user equipment. Semi-persistent allocation of transmission resources generally refers to initial transmissions that are persistently scheduled, and retransmissions (e.g., after a negative acknowledgment) that are dynamically scheduled. Uses of the terms "persistent" and "semi-persistent" resources in discussions of 3GPP communication systems generally refer to similar processes, and they will be used interchangeably herein. The optimization technique assigns semi-persistent resources for transmission in a downlink ("DL") or in an uplink ("UL"). For example, in systems configured to support the 3GPP LTE project, semi-persistent and dynamic resource scheduling has generally been included in system designs.

For semi-persistent scheduling, a pattern of periodic transmission/reception resources are assigned to user equipment ("UE") using higher layer signaling and physical downlink control channel ("PDCCH") signaling. For example, for a resource with a 20 millisecond ("ms") time periodicity, the periodicity is signaled with higher layer signaling (e.g., radio resource control ("RRC") signaling), and is assigned using a PDCCH, allowing the user equipment to transmit or receive using pre-assigned resources without further explicit Layer 1/Layer 2 ("L1/L2") control signaling (i.e., without further PDCCH signaling).

The user equipment generally maintains the value of a new data indicator ("NDI") flag, which signals to the receiver the new or repeat nature of a transmission. Normally, with dynamic scheduling, the NDI flag is signaled explicitly in control signaling in a PDCCH. However, for semi-persistently allocated resource scheduling, PDCCH signaling and thus an NDI flag, is not transmitted for the initial transmission to conserve transmission resources. There is also the issue of how an NDI flag would be signaled or otherwise handled for retransmission of data that might be made, for example, by a base station in response to a "negative acknowledgment" ("NACK") signal from user equipment to indicate failed data reception in a hybrid automatic retransmit request ("HARQ") arrangement. The user equipment requires an NDI flag so that it can treat received data as a new input or as a repeated transmission of previously received data that should be combined therewith for its reliable interpretation. The NDI is also used for uplink transmissions. In an LTE uplink, the NDI is sent in a downlink on the PDCCH, and based thereon, the user equipment either retransmits or transmits new data.

Considering the limitations as described above, a system and method to reliably indicate a value for an NDI flag for semi-persistently allocated transmission resources for various signaling conditions or other allocation without the PDCCH is not presently available for the wireless applications that lie ahead. Accordingly, what is needed in the art is a communication system that can reliably exchange an NDI flag between a base station and user equipment for the various resource allocation arrangements and for the various signaling situations that can be anticipated to be encountered.

SUMMARY OF THE INVENTION

These and other problems are generally solved or circumvented, and technical advantages are generally achieved, by advantageous embodiments of the present invention which includes an apparatus employable in a communication system configured to determine a value for a new data indicator for semi-persistently allocated or scheduled resources. In one embodiment, the apparatus (e.g., user equipment) includes a processor configured to receive a cell radio network temporary identifier indicating a semi-persistent scheduling. The processor is also configured to treat a reception of data with a new data indicator flag in accordance with the semi-persistent scheduling as one of a persistent initial transmission if a value of the new data indicator flag is equal to a first predefined value (e.g., a value of zero), and a retransmission of semi-persistent scheduling data if the value of the new data indicator flag is equal to a second predefined value (e.g., a value of one).

In another embodiment, the apparatus (e.g., a base station) includes a processor configured to provide a cell radio network temporary identifier indicating a semi-persistent scheduling. The processor is also configured to derive a new data indicator flag having one of a first predefined value (e.g., a value of zero) for a persistent initial transmission of data in accordance with the semi-persistent scheduling, and a second predefined value (e.g., a value of one) for a retransmission of semi-persistent scheduling data in accordance with the semi-persistent scheduling.

In another embodiment related to another aspect, the apparatus (e.g., user equipment) includes a processor configured to receive a random access response indicating a resource allocation according to a random access channel procedure. The processor is also configured to set a new data indicator to a predefined value (e.g., a value of zero) for a hybrid automatic repeat request process corresponding to the resource allocation, and initiate a new transmission for the hybrid automatic repeat request process. In a related, but alternative embodiment, the apparatus (e.g., a base station) includes a processor configured to provide a random access response indicating a resource allocation according to a random access channel procedure. The processor is also configured to receive a new transmission for a hybrid automatic repeat request process in accordance with the resource allocation and employ a predefined value (e.g., a value of zero) for a new data indicator.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. The present invention will be described with respect to exemplary embodiments in a specific context of reliably determining a value for an NDI flag for semi-persistently allocated transmissions. In general, the invention may be applied to any communication system such as a cellular or ad hoc wireless communication network.

As will hereinafter be introduced and discussed in more detail, a communication system (e.g., including a wireless cellular communication network) is configured to determine a value for an NDI flag for semi-persistently allocated or scheduled resources. An apparatus (e.g., a base station) includes a processor configured to derive a value of an NDI flag. The value of the NDI flag may be toggled by the processor for every transmission by the apparatus. The NDI flag may also be a fixed value for persistent allocations. The value of the NDI flag may also be implicitly derived from a number of hybrid automatic retransmit request ("HARQ") processes reserved for semi-persistent allocations, a system frame number ("SFN") and semi-persistent periodicity. The apparatus also includes a transceiver configured to transmit the NDI flag on a control channel such as a physical downlink control channel ("PDCCH"). In accordance therewith, an apparatus (e.g., user equipment) includes a transceiver configured to receive the NDI flag and a processor thereof configured to cause a data buffer to combine data associated with the NDI flag with data stored in the buffer or flush the buffer and process the data as new data based on the NDI flag.

Figure 1:
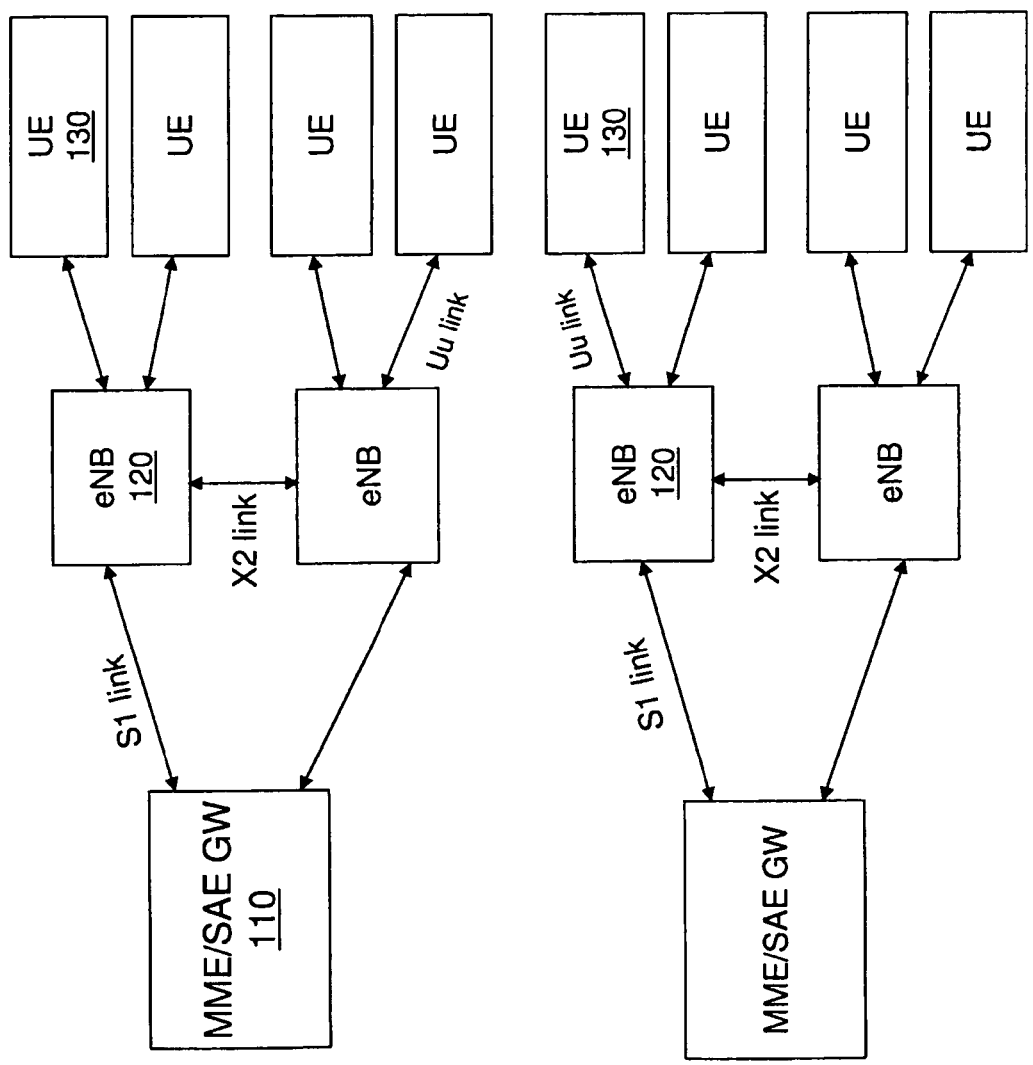
FIGS. 1 and 2 illustrate system level diagrams of embodiments of communication systems including a wireless communication systems that provide an environment for application of the principles of the present invention.

Referring initially to FIG. 1, illustrated is a system level diagram of an embodiment of a communication system including a wireless communication system that provides an environment for the application of the principles of the present invention. Although the communication system illustrated in FIG. 1 represents a cellular communication system, ad hoc wireless communication systems, such as those described by IEEE Standard 802.16, which is incorporated herein by reference, provide another environment for the application of the principles of the present invention. The wireless communication system may be configured to provide evolved UMTS terrestrial radio access network ("e-UTRAN") universal mobile telecommunications services. A mobile management entity/system architecture evolution gateway ("MME/SAE GW," one of which is designated 110) provides control functionality for an e-UTRAN node B (designated "eNB," an "evolved node B," also referred to as a "base station," one of which is designated 120) via an S1 communication link (ones of which are designated "S1 link"). The base stations 120 communicate via X2 communication links (designated "X2 link"). The various communication links are typically fiber, microwave, or other high-frequency metallic communication paths such as coaxial links, or combinations thereof.

The base stations 120 communicate with user equipment ("UE," ones of which are designated 130), which is typically a mobile transceiver carried by a user. Thus, communication links (designated "Uu" communication links, ones of which are designated "Uu link") coupling the base stations 120 to the user equipment 130 are air links employing a wireless communication signal such as, for example, an orthogonal frequency division multiplex ("OFDM") signal.

Figure 2:
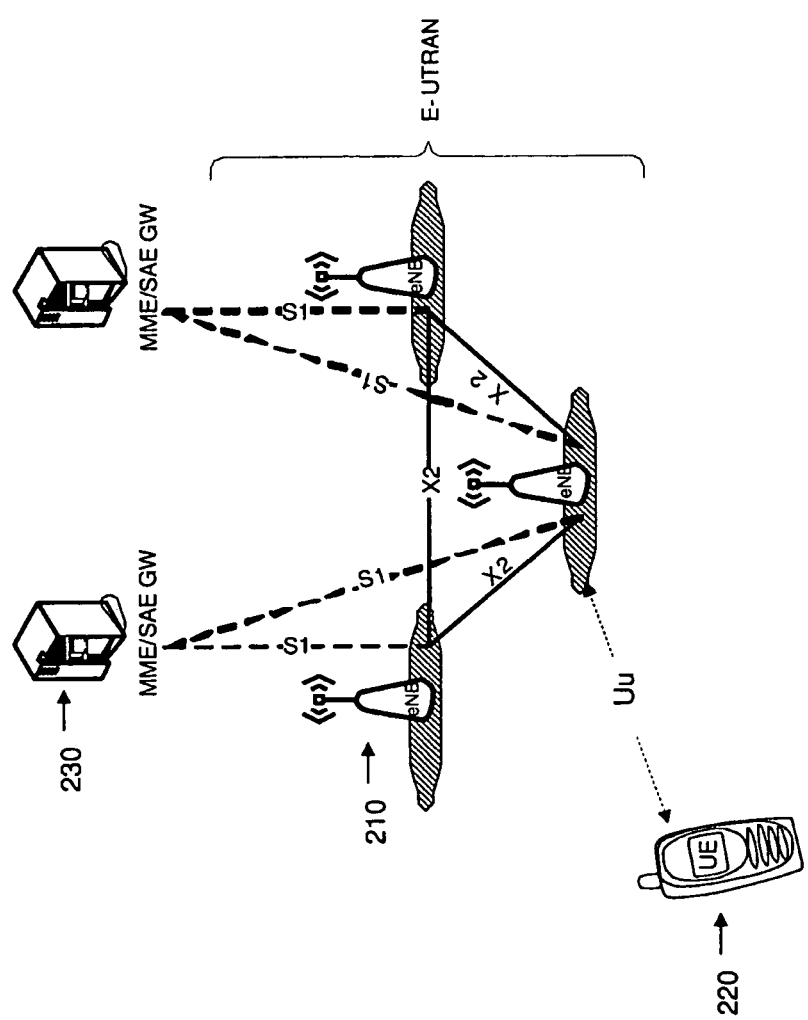

Turning now to FIG. 2, illustrated is a system level diagram of an embodiment of a communication system including a wireless communication system that provides an environment for the application of the principles of the present invention. The wireless communication system provides an e-UTRAN architecture including base stations (one of which is designated 210) providing e-UTRAN user plane (packet data convergence protocol/radio link control/media access control/physical) and control plane (radio resource control) protocol terminations towards user equipment 220. The base stations 210 are interconnected with X2 interfaces or communication links (designated "X2"). The base stations 210 are also connected by S1 interfaces or communication links (designated "S1") to an evolved packet core ("EPC") including a mobile management entity/system architecture evolution gateway ("MME/SAE GW," one of which is designated 230). The S1 interface supports a multiple entity relationship between the mobile management entity/system architecture evolution gateway 230 and the base stations 210. For applications supporting inter-public land mobile handover, inter-eNB active mode mobility is supported by the mobile management entity/system architecture evolution gateway 230 relocation via the S1 interface.

The base stations 210 may host functions such as radio resource management. For instance, the base stations 210 may perform functions such as internet protocol ("IP") header compression and encryption of user data streams, ciphering of user data streams, radio bearer control, radio admission control, connection mobility control, dynamic allocation of resources to user equipment in both the uplink and the downlink, selection of a mobility management entity at the user equipment attachment, routing of user plane data towards the user plane entity, scheduling and transmission of paging messages (originated from the mobility management entity), scheduling and transmission of broadcast information (originated from the mobility management entity or operations and maintenance), and measurement and reporting configuration for mobility and scheduling. The mobile management entity/system architecture evolution gateway 230 may host functions such as distribution of paging messages to the base stations 210, security control, termination of U-plane packets for paging reasons, switching of U-plane for support of the user equipment mobility, idle state mobility control, and system architecture evolution bearer control. The user equipment 220 receives an allocation of a group of information blocks from the base stations 210.

Figure 3:
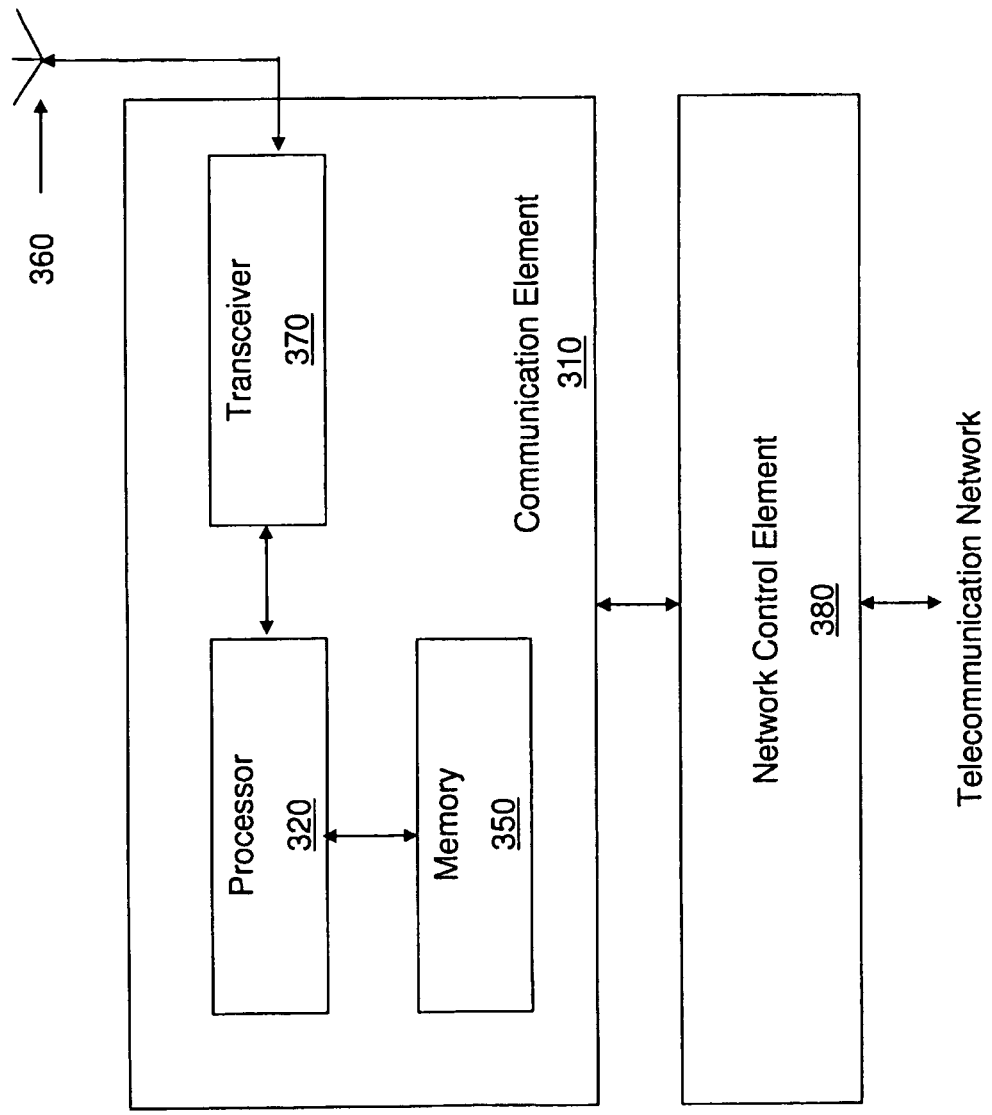
FIG. 3 illustrates a system level diagram of an embodiment of a communication element of a communication system for application of the principles of the present invention.

Turning now to FIG. 3, illustrated is a system level diagram of an embodiment of a communication element 310 of a communication system for application of the principles of the present invention. The communication element or device 310 may represent, without limitation, a base station, user equipment such as a terminal or mobile station, a network control element, communication node, or the like. The communication element 310 includes, at least, a processor 320, memory 350 that stores programs and data of a temporary or more permanent nature, an antenna 360, and a radio frequency transceiver 370 coupled to the antenna 360 and the processor 320 for bidirectional wireless communication. The communication element 310 may provide point-to-point and/or point-to-multipoint communication services.

The communication element, such as a base station in a cellular network, may be coupled to a communication network element, such as a network control element 380 of a public switched telecommunication network ("PSTN"). The network control element 380 may, in turn, be formed with a processor, memory, and other electronic elements (not shown). The network control element 380 generally provides access to a telecommunication network such as a PSTN. Access may be provided using fiber optic, coaxial, twisted pair, microwave communication, or similar link coupled to an appropriate link-terminating element. A communication element 310 formed as a mobile station is generally a self-contained device intended to be carried by an end user.

The processor 320 in the communication element 310, which may be implemented with one or a plurality of processing devices, performs functions associated with its operation including, without limitation, encoding and decoding (encoder/decoder) of individual bits forming a communication message, formatting of information, and overall control (controller) of the communication element, including processes related to management of resources (resource manager). Exemplary functions related to management of resources include, without limitation, hardware installation, traffic management, performance data analysis, tracking of end users and equipment, configuration management, end user administration, management of user equipment, management of tariffs, subscriptions, and billing, and the like. The execution of all or portions of particular functions or processes related to management of resources may be performed in equipment separate from and/or coupled to the communication element 310, with the results of such functions or processes communicated for execution to the communication element 310. The processor 320 of the communication element 310 may be of any type suitable to the local application environment, and may include one or more of general-purpose computers, special purpose computers, microprocessors, digital signal processors ("DSPs"), and processors based on a multi-core processor architecture, as non-limiting examples.

The transceiver 370 of the communication element 310 modulates information onto a carrier waveform for transmission by the communication element 310 via the antenna 360 to another communication element. The transceiver 370 demodulates information received via the antenna 360 for further processing by other communication elements.

The memory 350 of the communication element 310, as introduced above, may be of any type suitable to the local application environment, and may be implemented using any suitable volatile or nonvolatile data storage technology such as a semiconductor-based memory device, a magnetic memory device and system, an optical memory device and system, fixed memory, and removable memory. The programs stored in the memory 350 may include program instructions that, when executed by an associated processor, enable the communication element to perform tasks as described herein. Of course, the memory 350 may form a data buffer for data transmitted to and from the communication element 310. Exemplary embodiments of the system, subsystems, and modules as described herein may be implemented, at least in part, by computer software executable by processors of, for instance, the user equipment and the base station, or by hardware, or by combinations thereof. As will become more apparent, systems, subsystems and modules may be embodied in the communication element as illustrated and described above.

In one embodiment, the processor 320 of an apparatus (the communication element 310 such as user equipment) is configured to receive a cell radio network temporary identifier indicating a semi-persistent scheduling or resource allocation, and treat a reception of data with a NDI flag in accordance with the semi-persistent scheduling as a persistent initial transmission if a value of the NDI flag is equal to a first predefined value (e.g., a value of zero). In such an instant, the processor 320 may instruct a data buffer resident in the memory 350 to flush data stored therein. The processor 320 is also configured to treat a reception of data with a NDI flag in accordance with the semi-persistent scheduling as a retransmission of semi-persistent scheduling data (e.g., in response to a negative acknowledgment signal indicating a failed reception of data in accordance with a hybrid automatic retransmit request) if a value of the NDI flag is equal to a second predefined value (e.g., a value of one). In such an instant, the processor 310 may cause a data buffer resident in the memory 350 to combine the retransmission of semi-persistent scheduling data with data stored therein. Additionally, the memory 350 is configured to store parameters (e.g., a time and frequency allocation, and a modulation and coding scheme for the reception of data) associated with the semi-persistent scheduling (e.g., if the value of the NDI flag is equal to the second predefined value). In a related, but alternative embodiment, the processor 320 is configured to receive another cell radio network temporary identifier indicating a non-semi-persistent scheduling or resource allocation, and treat another reception of data with another NDI flag in accordance with the non-semi-persistent scheduling as one of new data if a value of the another new data indicator flag is different than a value of a previously received NDI flag, and retransmitted data if the value of the another new data indicator flag is equal to the value of the previously received new data indicator flag.

In another embodiment, the processor 320 of an apparatus (the communication element 310 such as a base station) is configured to provide a cell radio network temporary identifier indicating a semi-persistent scheduling or resource allocation and derive a NDI flag. The NDI flag has a first predefined value (e.g., a value of zero) for a persistent initial transmission of data in accordance with the semi-persistent scheduling, and a second predefined value (e.g., a value of one) for a retransmission of semi-persistent scheduling data (e.g., in response to a negative acknowledgment signal indicating a failed reception of data in accordance with a hybrid automatic retransmit request) in accordance with the semi-persistent scheduling. The processor 320 is also configured to provide another cell radio network temporary identifier indicating a non-semi-persistent scheduling or resource allocation and derive another NDI flag. The another NDI flag has a value different than a value of a previously transmitted NDI flag for new data in accordance with the non-semi-persistent scheduling, and a value equal to the value of the previously transmitted new data indicator flag for retransmitted data in accordance with the non-semi-persistent scheduling.

In one embodiment related to another aspect, the processor 320 of an apparatus (the communication element 310 such as user equipment) is configured to provide a random access preamble and receive a random access response indicating a resource allocation according to a random access channel procedure. The processor 320 is also configured to set a new data indicator to a predefined value (e.g., a value of zero) for a hybrid automatic repeat request process corresponding to the resource allocation, and initiate a new transmission for the hybrid automatic repeat request process. The predefined value of new data indicator is used as a reference for a new data indicator flag received in an uplink grant for a subsequent transmission for the hybrid automatic repeat request process. Additionally, the memory 350 is configured to store parameters associated with the resource allocation.

In another related embodiment, the processor 320 of an apparatus (the communication element 310 such as a base station) is configured to receive a random access preamble and provide a random access response indicating a resource allocation according to a random access channel procedure. The processor 320 is also configured to receive a new transmission for a hybrid automatic repeat request process in accordance with the resource allocation and employ a predefined value (e.g., a value of zero) for a new data indicator. The predefined value of the new data indicator is used as a reference for a new data indicator flag provided in an uplink grant for a subsequent transmission for the hybrid automatic repeat request process. Additionally, the memory 350 is configured to store parameters associated with the resource allocation.

Figure 4A:
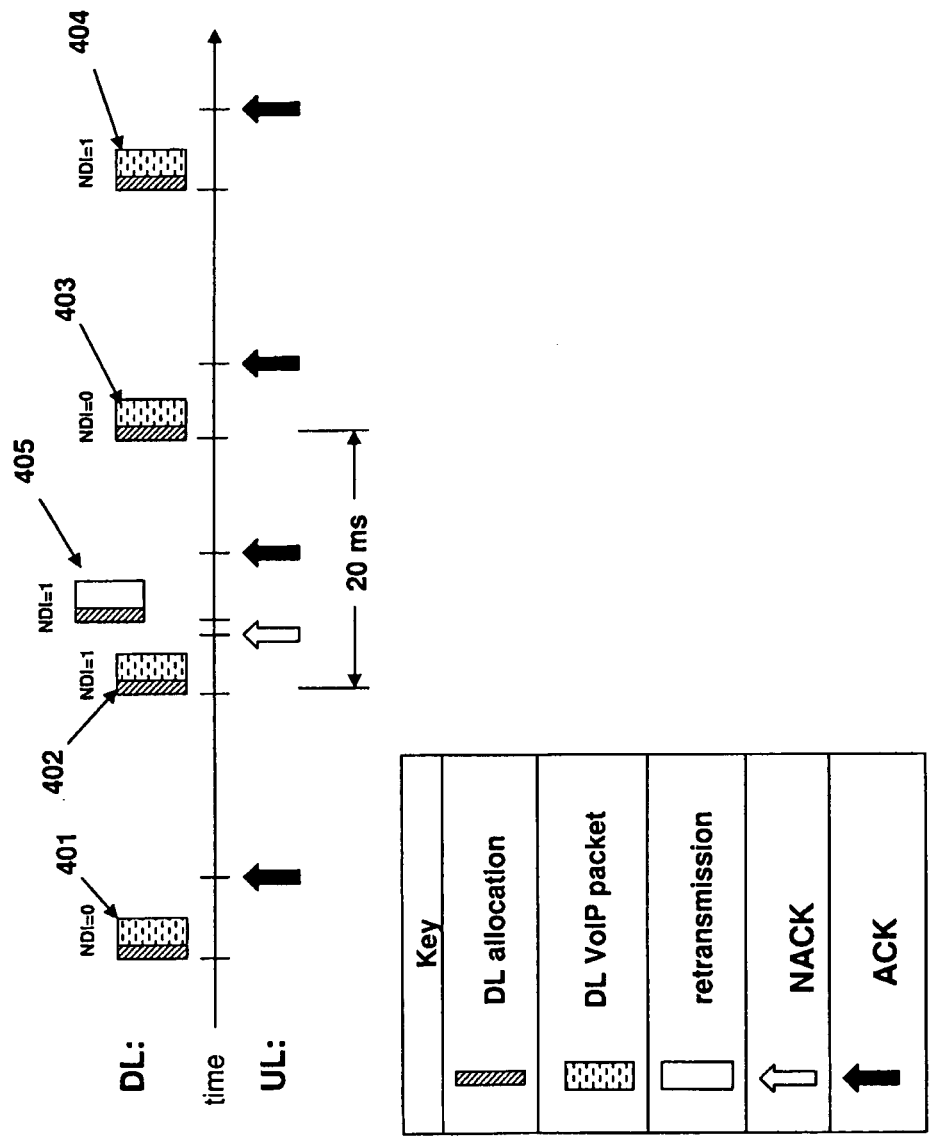
FIGS. 4A and 4B illustrate diagrams of exemplary talkspurt based dynamic or semi-persistent scheduling, respectively, in a downlink employing voice over internet protocol in accordance with the principles of the present invention.
Figure 4B:
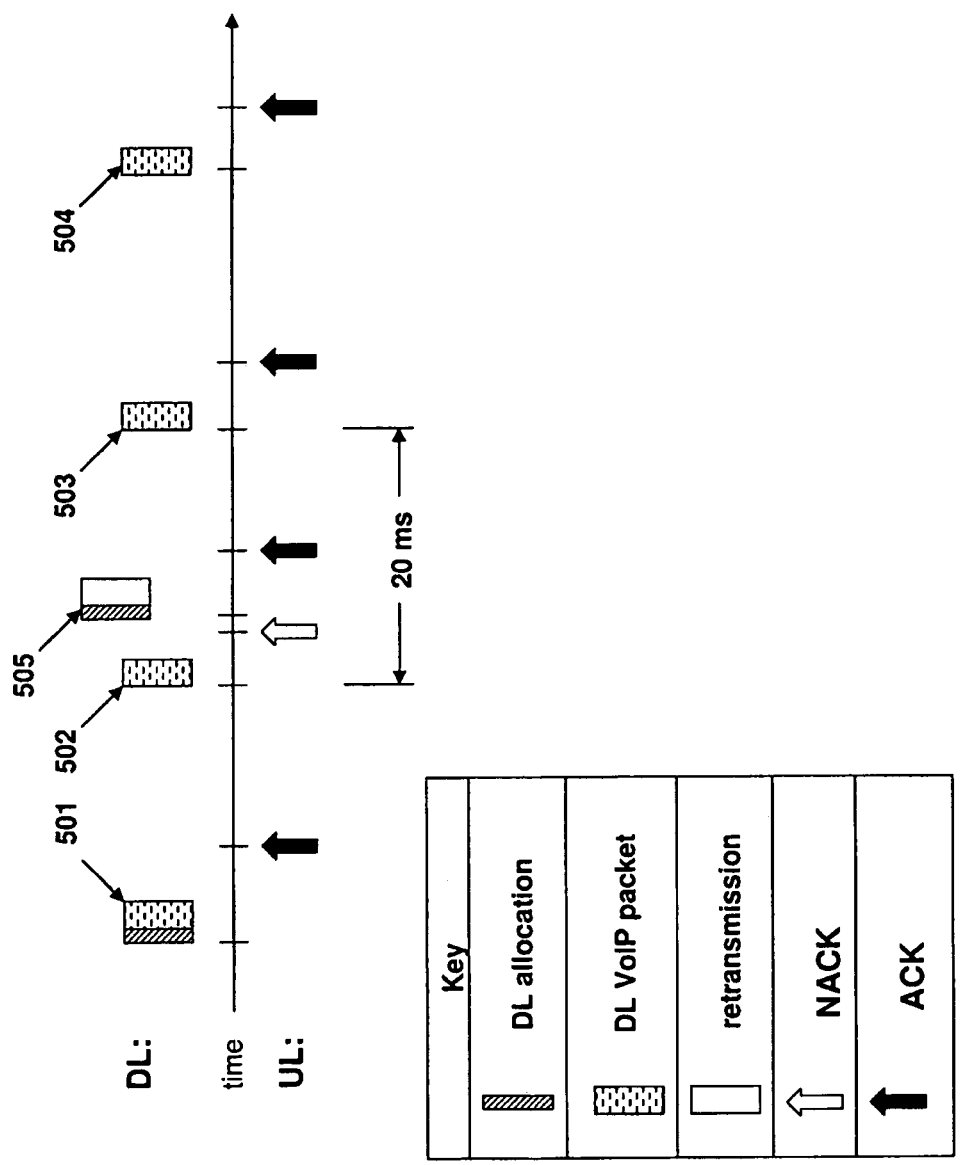

Turning now to FIGS. 4A and 4B, illustrated are diagrams of exemplary talk-spurt based dynamic or semi-persistent scheduling, respectively, in a downlink employing voice over internet protocol ("VoIP"). Beginning with FIG. 4A, illustrated is an example of dynamic scheduling of the VoIP packets. Each data transmission is associated with a control channel (e.g., a PDCCH) transmission (downlink allocation) meaning that the new transmissions and retransmissions are sent on the PDCCH. FIG. 4A also illustrates the normal use of an NDI bit/flag. An initial allocation and VoIP packet 401 are transmitted in a downlink. The associated NDI flag is set, for example, to zero. The NDI flag is toggled for each new transmission (402, 403, 404) and kept the same for retransmissions (405). Thus, the transceiver knows whether the transmission should be combined with the previous transmission (same NDI flag) or whether the buffer should be flushed (different NDI flag).

Turning now to FIG. 4B, illustrated is an example of talk-spurt based semi-persistent scheduling in a downlink for VoIP. When traffic is identified at the beginning of a talk spurt, time and frequency resources and a transport format are assigned to the user equipment with L1/L2 control signaling (e.g., using a PDCCH). In principle, the radio resource control provides the time periodicity, and possibly also the transport block size ("TBS"). Then, the PDCCH is used once at the beginning of the talk spurt (downlink allocation for packet 501) to provide a time and frequency allocation, a modulation and coding scheme ("MCS"), and possibly information for hybrid automatic retransmit request ("HARQ") and acknowledgment/negative acknowledgment ("ACK/NACK") resources. The user equipment stores the time and frequency resources and transport format information in memory. The data enable the user equipment either to transmit using the assigned format of packets on an uplink or to receive on a downlink with these resources, with a known periodicity pattern as signaled via the radio resource control.

In FIG. 4B, a first VoIP packet 501 is sent with a PDCCH providing a persistent, allocated resource and a modulation and coding scheme. A second (new) VoIP packet 502 and subsequent (new) VoIP packets 503, 504 can then be sent without the need for explicit PDCCH signaling. The HARQ ACK and NACK responses and an exemplary retransmission (505) are also illustrated in FIG. 4B. Retransmissions in the downlink are sent using L1/L2 control signaling (in the PDCCH). Persistent scheduling thus only needs be applied for the initial transmission.

It has been contemplated that a new data indicator ("NDI") flag, which advises the receiver of the new/repeat nature of the transmission, may be signaled explicitly with one bit, both for uplink and downlink in L1/L2 control signaling (in the PDCCH). In accordance therewith, the NDI flag is toggled or changed between consecutive transport blocks for each new transmission, (i.e., not for a repeated transmission) for example, in response to an ACK signal. For example, with two retransmissions, the NDI flag is left unchanged at either one or zero, and then for each new transmission the flag is changed so that, as represented in FIG. 4A, the NDI flag for four new transmissions would be the sequence [1, 0, 1, 0] in their corresponding PDCCH. This indicates that the NDI flag will change from zero to one, or from one to zero, for each transmission of new data. For a retransmission, however, the NDI flag will keep the same value as that used for the initial (or previous) transmission of the same data packet. A change in NDI value thus means that a packet is new. The corresponding data buffer such as the HARQ buffer is flushed and the received information is not combined with old information in the HARQ buffer.

For semi-persistent scheduling, PDCCH data are not sent for the initial transmission, and thus the value of the NDI flag is not known, i.e., it is not signaled explicitly, and thus the NDI value to use in a retransmission is not known. The value of the NDI flag for the initial transmission needs to be known to correctly receive and combine corresponding HARQ retransmissions.

One solution to knowing the value of the NDI flag is to toggle the NDI flag for each transmission, for both semi-persistent and dynamically allocated resources, and for each semi-persistent transmission possibility, i.e., even if nothing is actually sent using a semi-persistent allocation. The user equipment would try to decode a transmission of new data, and accordingly assume a changed value for the NDI flag.

Figure 5:
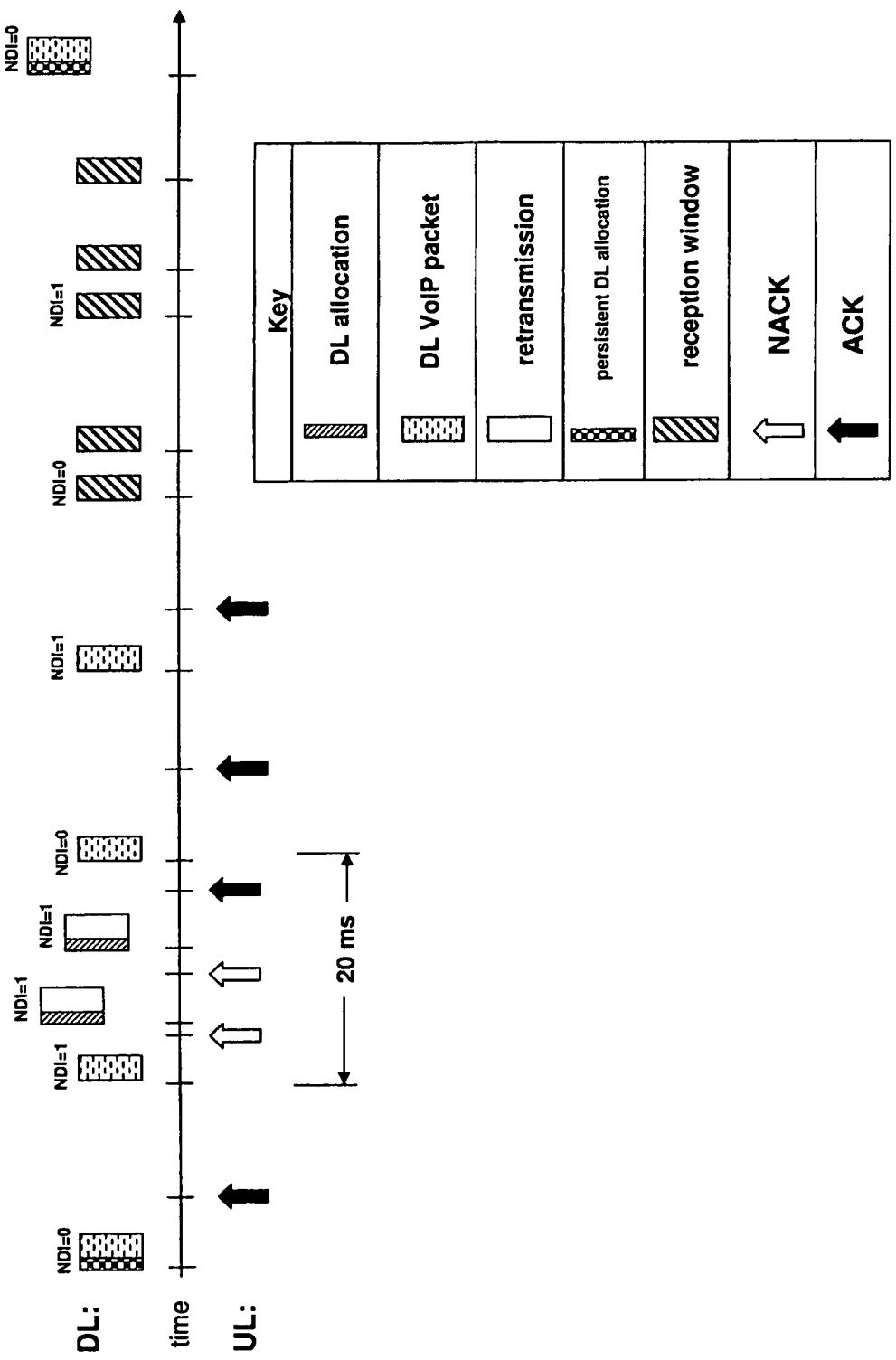
FIG. 5 illustrates a diagram of an embodiment of a value of a new data indicator flag that alternates in a case of semi-persistent resource allocation in accordance with the principles of the present invention.

It is noted that the NDI flag is sent on the PDCCH, and thus in FIG. 4A, it is sent with downlink allocations. Transmissions without the need for further PDCCH resource allocations are semi-persistent allocations, and for these the NDI flag is not explicitly signaled. However, FIG. 5 illustrates semi-persistent allocations for which the NDI flag value is implicitly assumed by the user equipment (the NDI value as shown in parentheses in FIG. 5). This is needed when combining retransmissions at the transceiver, since the same NDI flag value indicates combining of data with previous data that was incompletely or incorrectly received, whereas a different NDI flag value indicates flushing of a HARQ buffer and not combining the received data with old data in the HARQ buffer. Retransmissions in a downlink are sent with PDCCH resources, and thus are also sent with an explicit NDI flag. This has the disadvantage that user equipment and the base station have the same understanding of the NDI flag value when a persistent resource is released. This may be difficult to achieve, especially if implicit release is assumed after number of persistent ("N_PS") allocations before implicit release unused persistent allocations. For semi-persistent scheduling, the PDCCH data is not sent for the initial transmission, and thus the NDI flag value is not known (i.e., which NDI flag value to use in a retransmission). The value of the NDI flag for an initial transmission needs to be known to correctly receive and combine corresponding HARQ retransmissions. Thus, the same problem exists even if the NDI flag value is changed only for packets that are actually transmitted.

Exemplary embodiments are now described in further detail for defining an NDI flag value for semi-persistently allocated transmission resources. In a first embodiment, the NDI flag as introduced above is toggled for every new transmission (for persistent and dynamically allocated resources), even if nothing is actually sent using a semi-persistent allocation (i.e., also for each semi-persistent transmission possibility). This includes the case when no new data is sent, but wherein user equipment expects a semi-persistent transmission. The user equipment would attempt to decode the transmission and assume a changed value for the NDI. Thus, in the first embodiment, both the user equipment and the base station change the NDI state when there are semi-persistently assigned or dynamically allocated resources, whether or not there is an actual transmission using these resources. For a retransmission, the NDI flag value is included in the PDCCH.

Turning now to FIG. 5, illustrated is a diagram of an embodiment of a value of a new data indicator flag that alternates in a case of semi-persistent resource allocation in accordance with the principles of the present invention. The downlink allocation refers to the downlink control information ("DCI") transmitted on the PDCCH giving the downlink allocation. A semi-persistent ("SP") downlink allocation refers to the downlink control information transmitted on the PDCCH giving the downlink allocation for semi-persistent use, that may include time, frequency, and the modulation and coding scheme that will be used periodically without further PDCCH input.

It is noted that the NDI flag is sent on the PDCCH, and thus in FIG. 5 it is sent with dynamic downlink allocations and with semi-persistent downlink allocations. The transmissions without the PDCCH data (including transmissions with semi-persistently allocated downlink resources) are made using semi-persistent resources. Allocations for these transmissions are not explicitly signaled and thus the NDI flags cannot be signaled either. However, FIG. 5 shows for semi-persistent resources that the NDI value (implicitly) is assumed by the user equipment (NDI flag within parentheses). This is needed when combining retransmissions, particularly after reception of a NACK. An unchanged NDI flag combines data in the HARQ buffer, whereas different NDI flags flush the HARQ buffer because new data has been received. Retransmissions in a downlink are sent on the PDCCH, and also include an explicit NDI flag.

In this embodiment, the user equipment and base station preferably have the same NDI flag understanding when a semi-persistent resource is released. Such a process should be executed carefully, especially if implicit release is assumed after N_PS unused persistent allocations. The same need for careful execution exists even if the NDI flag is changed only for packets that are actually transmitted.

Figure 6:
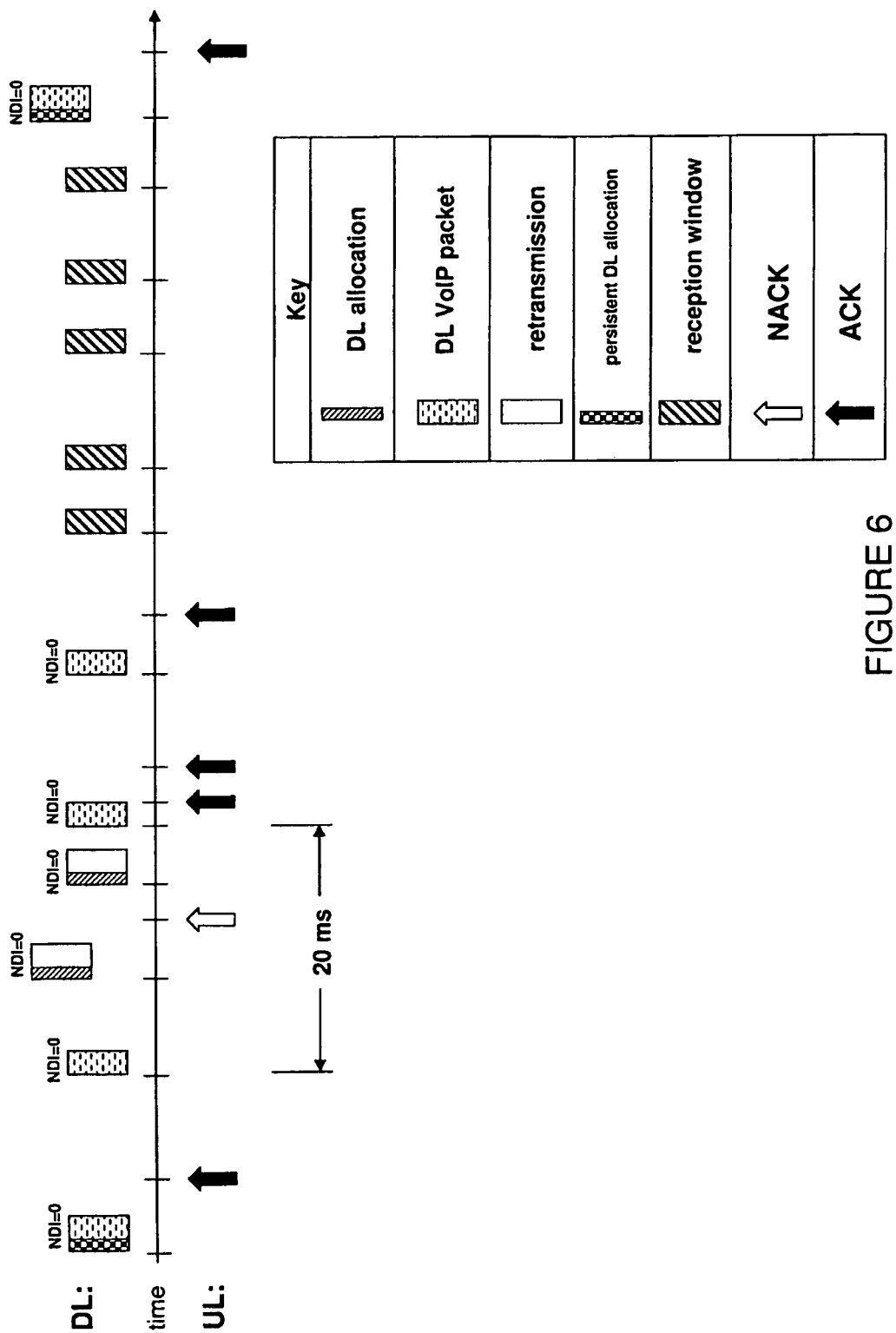
FIG. 6 illustrates a diagram of an embodiment of a value of a new data indicator flag that is fixed for semi-persistent resource allocation in accordance with the principles of the present invention.

In accordance with another embodiment, as illustrated in FIG. 6, a value of a new data indicator flag is fixed for semi-persistent resource allocation in accordance with the principles of the present invention. For example, the value of the NDI flag is fixed either at NDI=0 or NDI=1. In this embodiment, the user equipment knows which NDI flag to assume for a transmission with a semi-persistently allocated resource. The data buffer such as a soft HARQ buffer is preferably flushed of old data whenever a semi-persistent allocation is received or is assumed to have been received. In other words, the flushing of the soft HARQ buffer is not based on the NDI flag, but instead on the knowledge of persistent allocation (only new transmissions are sent using persistent allocation).

The NDI flag is sent on PDCCH and thus, as illustrated in FIG. 6, the NDI flag is transmitted with both dynamical and semi-persistent downlink allocation. The transmissions without the PDCCH data, including semi-persistently allocated downlink resources, are semi-persistent allocations, and for these the NDI flag is not signaled. However, FIG. 6 illustrates that the NDI flag is implicitly assumed by the user equipment (NDI within parenthesis). This is needed when combining retransmissions, wherein an unchanged NDI flag indicates combining the retransmitted data, and a different NDI flag tells to user equipment to flush the HARQ buffer.

In this second embodiment, the combination of dynamic and semi-persistent allocations for the same HARQ process are preferably carefully treated in the system design. In one embodiment, some HARQ processes are reserved for semi-persistent scheduling, and thus these processes are not used with dynamic resource scheduling. In another embodiment, some dynamic scheduling is allowed (e.g., when overriding a semi-persistent allocation with a dynamic allocation). That dynamic allocation could then naturally use NDI=1. If the dynamic allocation is a retransmission of a semi-persistently allocated transmission, NDI=0 can be naturally used. Thus, a simple way can be employed to distinguish between a new transmission and a retransmission based on a changed NDI.

Thus, a rule for this second embodiment for NDI with a semi-persistent resource allocation is to set, for example, NDI=0 (without PDCCH), and with dynamic allocation (with PDCCH) to normally toggle the NDI flag. Buffer flushing can operate normally based on a changed NDI value when dynamic allocation for a new transmission is received on the PDCCH. When the PDCCH data is not sent (as for a semi-persistent allocation), the user equipment knows that it is a new transmission and can flush the buffer.

Figure 7:
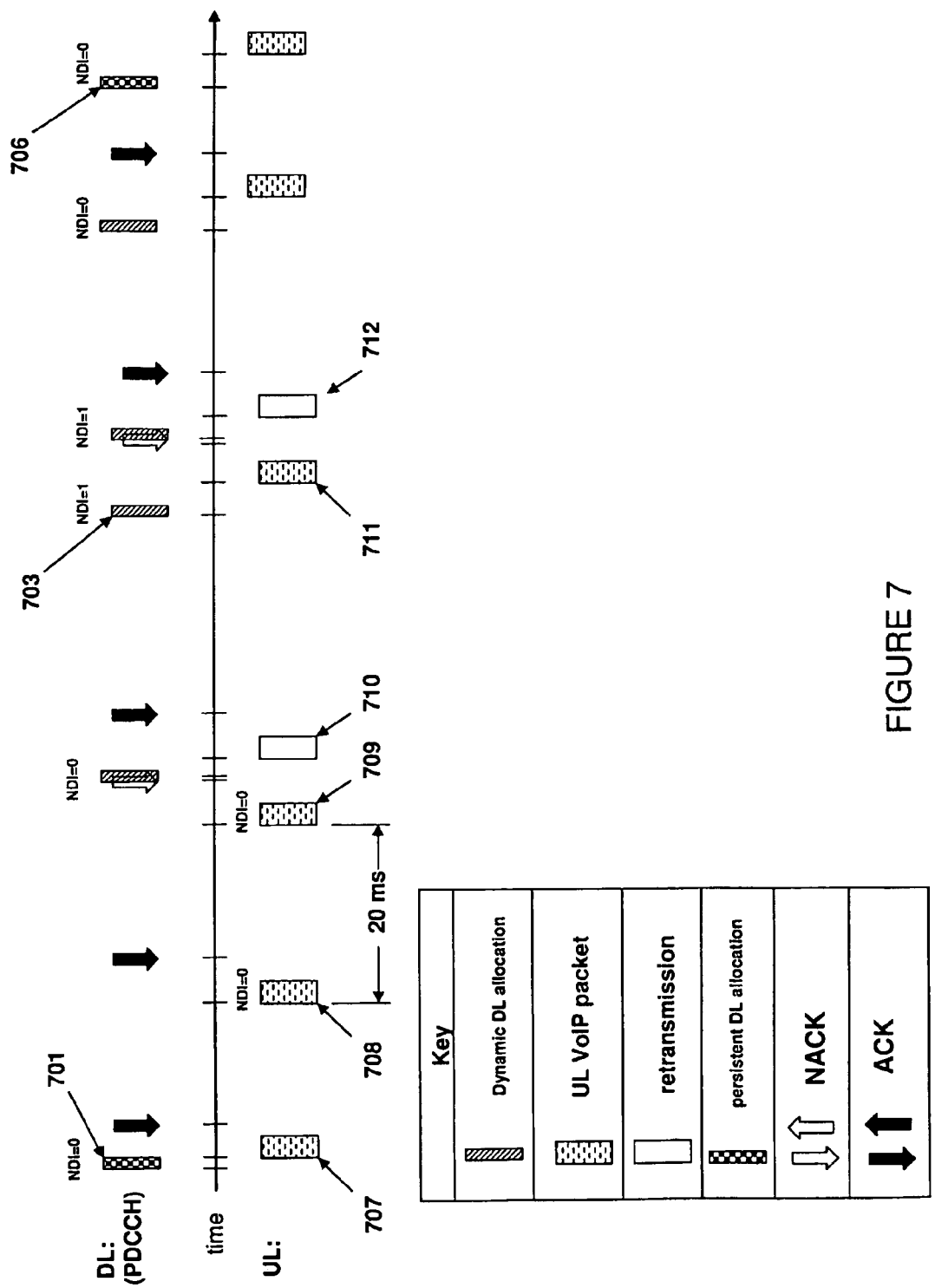
FIG. 7 illustrates a diagram of an embodiment of an uplink data transmission wherein a fixed value is assumed for a new data indicator flag in accordance with the principles of the present invention.

Turning now to FIG. 7, illustrated is a diagram of an embodiment of an uplink data transmission wherein a fixed value is assumed for a new data indicator flag in accordance with the principles of the invention. For the uplink data transmission, the corresponding uplink resource grants are sent in the downlink on the PDCCH. At the beginning of a talk spurt, the base station sends a persistent allocation (a resource grant) on the PDCCH (701). The user equipment stores the relevant parameters (time-frequency resources, modulation and coding scheme) and sends the uplink packet (707) using the allocation. The next uplink packet (708) can be sent without receiving a dynamic uplink allocation on the PDCCH using the stored persistent allocation (assuming NDI=0). The same is true for the next packet (709). If that packet is not received correctly, the base station requests a retransmission. Retransmission is indicated by using the same NDI value as that used for the initial transmission. Here NDI=0 is assumed for all persistently allocated transmissions. The user equipment retransmits the packet (710) and base station combines the packet with the previous transmission. The next transmission is allocated dynamically by sending uplink a resource grant on the PDCCH (703). Now, the NDI flag is normally toggled to indicate a new transmission (thus, now NDI=1). Since the uplink packet (711) is not received correctly, the base station requests a retransmission, indicated by NDI=1 (i.e., the same value as that used for the initial/previous transmission), and the user equipment retransmits the packet (712). The next transmission is again dynamically allocated by sending uplink a resource grant on PDCCH, and NDI is again toggled (NDI=0) to indicate a new transmission. The next allocation (706) sent on PDCCH is a persistent allocation. Since the persistent allocation is always a new transmission, the NDI flag is not needed to indicate a new transmission. Therefore, the NDI flag can take any value. Here we assume NDI=0.

Several known ways have been introduced for indicating that an allocation sent on the PDCCH is a persistent allocation (and should be stored). One way allocates two user equipment identifications (e.g., cell radio network temporary identifiers ("C-RNTIs")) for one user equipment, one for a dynamic allocation and one for a persistent allocation (to be stored). The user equipment identification (C-RNTI) is sent on PDCCH by masking the PDCCH cyclic redundancy check ("CRC") with the user equipment identification. When the user equipment receives the PDCCH data, it decodes it and calculates the cyclic redundancy check and masks the cyclic redundancy check with its own user equipment identification, and then compares the cyclic redundancy check with the received cyclic redundancy check. If they match, the user equipment knows that the transmission is for it. If it does not match, then either a transmission error has occurred or the transmission was sent for another user equipment (having a different user equipment identification). Thus, if two user equipment identifications are allocated for a user equipment, then the user equipment after decoding the PDCCH data tries to mask it with both user equipment identifications, and if one of them matches, then user equipment knows that PDCCH is meant for it, and then based on which user equipment identification matched, the user equipment knows whether the allocation is a dynamic (one time) allocation or a persistent allocation (to be stored).

If another user equipment identification (C-RNTI) is used to indicate the persistent allocation (call it "C-RNTI_P"), there are two alternative modes of operation. First, the C-RNTI_P is used only at the beginning of the data (talk) burst when parameters to be stored are sent on the PDCCH (i.e., for the persistent initial transmission only), or second, the C-RNTI_P is used also for retransmissions. The NDI flag is handled differently in these two cases.

The case where C-RNTI_P is only used for a persistent initial transmission at the beginning of a talk spurt is considered first. In this case, the C-RNTI_P indicates simply that this allocation is a persistent allocation and the relevant parameters should be stored. Since that allocation is sent with a new transmission, the NDI flag is not needed to indicate whether the transmission is a new transmission or a retransmission, since C_RNTI_P already indicates that it is a new transmission. Therefore, the NDI flag could take any value. Here the NDI flag could have a fixed value (e.g., NDI=0). Then the false alarm rate can be reduced. False alarm here refers to a PDCCH data intended for some other user or just random noise received by the user equipment being decoded "correctly," (i.e., CRC+UE identification masking matches), since all the cases where NDI=1 is received can be discarded. Here, the use of the NDI flag for subsequent transmissions (retransmissions or new transmissions without PDCCH) can be according to previous embodiments (e.g., using a fixed value for NDI such as NDI=0). To summarize, for the initial persistent allocation (sent at the beginning of the talk/data spurt), another user equipment identification (C-RNTI_P) (or any other known or not previously known method) indicates that the allocation is a new persistent allocation, and the relevant parameters should be stored. The NDI flag can be fixed to reduce the false alarm rate. The retransmissions are sent with normal user equipment identification, and the NDI flag is used normally to indicate whether or not the transmission should be combined with the previous transmission, since an unchanged NDI flag indicates retransmission (combining data), and a different NDI flag indicates new transmission (flushing the buffer in the receiver, i.e., not combining data). New persistent transmissions are made without the PDCCH data and assume that NDI=0.

Another alternative is to also use C-RNTI_P for retransmissions of the new transmissions (sent without PDCCH) using the persistently allocated resources. In this case, C-RNTI_P indicates that this PDCCH relates to persistent scheduling, but C-RNTI_P alone does not indicate whether the PDCCH is for a new transmission (and the relevant parameters should be stored) or for a retransmission. Here, the NDI flag can be used, but in a different way than described earlier. Since transmissions using persistent allocation (without PDCCH) are always new transmissions, NDI flag toggling is not needed to indicate where a new transmission starts. Instead, the NDI flag can be used to indicate whether the PDCCH transmission with C-RNTI_P is a persistent initial transmission (with parameters that should be stored such as NDI=0), or a retransmission (e.g., NDI=1). In this case, the NDI flag could also be recognized as, for example, a retransmission indicator flag.

Alternatively, in the above cases where another user equipment identification is used to indicate the persistent allocation, different data scrambling can be used instead of the second user equipment identification. Then, the information part of the PDCCH data is scrambled with a known sequence before calculating the cyclic redundancy check, and the user equipment first decodes PDCCH data and descrambles the information part before it checks the cyclic redundancy check. Thus, the PDCCH data is a normal PDCCH if the cyclic redundancy check matches without descrambling, and the PDCCH data is for a persistent allocation if the cyclic redundancy check matches with descrambling. The NDI operations are the same as described above.

When dynamic scheduling overwrites the initial transmission of semi-persistent scheduling, the value of the NDI flag will normally be toggled from the previous value for the same HARQ process if a new transmission is sent. If a retransmission is sent instead of the semi-persistent initial transmission, the value of the NDI flag is the same as for the previous transmission, and thus the user equipment should combine the transmission with the information in the HARQ buffer.

Figures 8A, 8B:
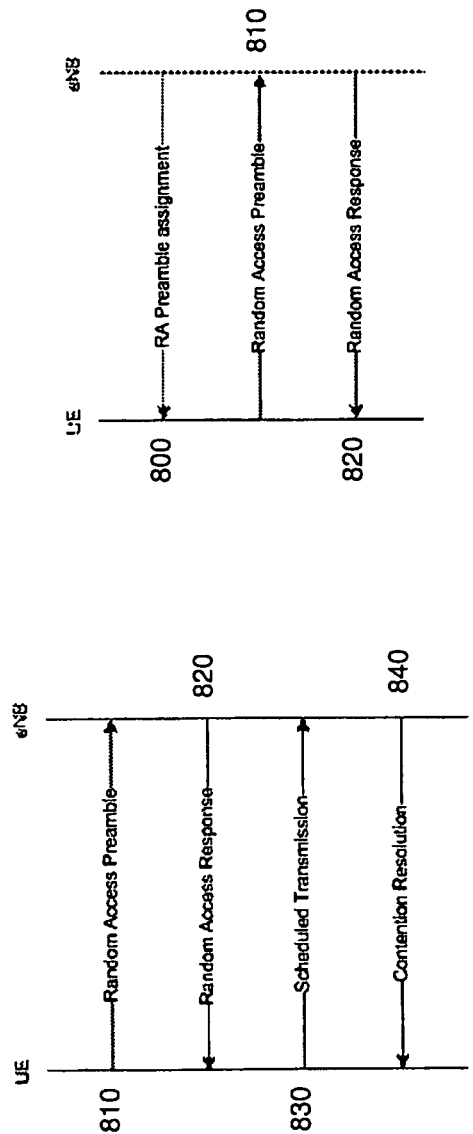
FIGS. 8A and 8B illustrate diagrams of embodiments of data transmission for a contention and non-contention based random access procedure, respectively, wherein a value is assumed for a new data indicator flag in accordance with the principles of the present invention.

Turning now to FIGS. 8A and 8B, illustrated are diagrams of embodiments of data transmission for a contention and non-contention based random access procedure, respectively, wherein a value is assumed for a new data indicator flag in accordance with the principles of the present invention. In a random access channel ("RACH") procedure (see, e.g., 3GPP TS 36.300, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," V8.4.0 (March 2008), which is incorporated herein by reference) as illustrated in FIG. 8A, a message 810 provides a random access preamble to the base station (designated "eNB") from the user equipment (designated "UE"). A message 820 contains the compact format of an uplink allocation of message 830 (in contention based RACH) and possibly also the compact format for a first uplink allocation after message 820 in non-contention based RACH. This compact format does not need to have the NDI flag and it could be fixed value as described above for semi-persistent allocation. The message 840 provides contention resolution to the user equipment.

As illustrated in FIG. 8B, a message 800 provides a random access preamble assignment from the base station to the user equipment. The messages 810, 820 are otherwise analogous to messages 810, 820 described above. Thus, in the case of the random access channel message 830 or possible first uplink transmission, the allocation can be done in RACH message 820 sent on a physical downlink shared channel (PDSCH) and provides an uplink allocation for transmission on uplink shared channel ("PUSCH") in a compact manner. This means that this allocation is done without normal PDCCH and does not necessarily include the NDI flag. Again, the fixed value of an NDI flag can also be used for an allocation done inside RACH message 820 or an allocation without PDCCH if it can be ensured that there will not be several simultaneous allocations for a user equipment. Since it can be assumed that there will only be one allocation in RACH message 829, a fixed NDI flag may be employed.

In a third embodiment, the NDI flag value is derived from the system frame number ("SFN") or transmission time interval/subframe number for semi-persistent resource allocations. This has the advantage that both the user equipment and the base station knowing the value of the NDI flag to use, which substantially eliminates the error cases. The number of reserved HARQ processes and associated periodicities are separately signaled via the radio resource control signaling to each user equipment. Several possibilities to implement these rules and some examples are listed below. For each of the illustrated cases, the derivation of the NDI flag value is HARQ-process based.

For the downlink, the NDI flag value is derived for each HARQ process as follows. The NDI=[floor(current TTI/(PS_period*Number_of_semi-persistent_HARQ))] mod 2, wherein the current_TTI=10*SFN+subframe#, subframe#=0, 1, 2, ..., 9. The PS_period refers to the periodicity of semi-persistent scheduling signaled via the radio resource control. TTI refers to the "Transmission Time Interval," which is typically 1 ms. The operation "mod 2" constrains the value of the NDI flag to be 0 or 1.

For the uplink, the number of HARQ processes used for HARQ is not signaled via the radio resource control, but is derived from the number of HARQ processes in a synchronous HARQ period (e.g., eight HARQ processes) referred to below as #HARQ process-s. The NDI flag value is derived for each HARQ process that will be used for semi-persistent allocations as follows. The NDI=[floor(current TTI/(PS_period*Number_of_semi-persistent_HARQ-s))] mod 2, wherein the current_TTI=10*SFN+subframe#, and where subframe#=0, 1, 2, ..., 9. The PS_period is the periodicity of semi-persistent scheduling signaled via the radio resource control. The Number_of_semi-persistent_HARQ-s=min {N}, where N*PS_period/#HARQ process-s=integer number. The principles of the third embodiment may also be represented in accordance with FIG. 6 wherein the NDI flag is derived from the system frame number, etc., as described hereinabove, rather than fixing the NDI value, for example, at zero.

Thus, an apparatus, system, computer program, and related method for signaling/determining the value of a new data indicator ("NDI") flag for a base station and user equipment with semi-persistent resource allocation has been introduced. In an embodiment, a transceiver of a base station provides the initial value of the NDI flag on a physical downlink control channel ("PDCCH"). The NDI flag may follow a known sequence during subsequent data transmissions without further resource signaling on the PDCCH. For instance, the NDI flag is presumed to be toggled by a processor of the base station for subsequent data transmissions for persistently and dynamically allocated resources, even if nothing is actually sent on persistently allocated resources. In another embodiment, the NDI flag is presumed to be a fixed value for subsequent data transmissions for persistent allocated resources. Retransmissions by the transceiver of the base station are sent with the PDCCH data, and include an explicit value for the NDI flag. In an embodiment, the NDI flag is signaled in downlink control information on the PDCCH. In a further embodiment, time and frequency resources, and a modulation and coding scheme ("MCS") are signaled on the PDCCH. In a further embodiment, retransmission data are combined by the processor of the user equipment/base station with prior transmission data after transmission of a negative acknowledgment signal. In a further embodiment, a data buffer such as a soft HARQ buffer in memory of the user equipment/base station is flushed of old data after transmission of an acknowledgment signal. In a further embodiment, the soft HARQ buffer is flushed of old data before or when receiving new data on a persistently allocated resource. In a further embodiment, a processor of the base station toggles the NDI flag with a dynamic resource allocation using PDCCH opposite to that of a semi-persistent resource allocation. In an embodiment, the NDI flag controls the soft combining of a hybrid automatic retransmit request process in a processor of the user equipment.

In another embodiment, the value of an NDI flag for a downlink is derived in the processor of the user equipment/base station using a system frame number, subframe number, periodicity of semi-persistent scheduling and the number of HARQ processes reserved for persistent scheduling signaled via the radio resource control. In another embodiment, the value of an NDI flag for an uplink is derived in a processor of the user equipment/base station using the number of HARQ processes in a synchronous HARQ period, subframe number, and the periodicity of semi-persistent scheduling signaled via the radio resource control.

In another embodiment, the NDI value is presumed to be a fixed value for all persistent new transmissions (sent without PDCCH). In a further embodiment, the same NDI value as used for an initial transmission is used for a retransmission. In a further embodiment, the NDI value for a dynamically allocated new transmission is toggled by the processor of the base station/user equipment from the previous NDI value in the associated HARQ process. The transmission may be semi-persistent or dynamic.

Also, although the present invention and its advantages have been described in detail, it should be understood that various changes, substitutions and alterations can be made herein without departing from the spirit and scope of the invention. For example, many of the processes discussed above can be implemented in different methodologies and replaced by other processes, or a combination thereof, to determine a value for an NDI flag for semi-persistently allocated transmission resources in a wireless communication system as described herein.

As described above, the exemplary embodiment provides both a method and corresponding apparatus consisting of various modules providing functionality for performing the steps of the method. The modules may be implemented as hardware (including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention.

The invention claimed is:

1. An apparatus, comprising:
a data buffer for storing received data;
at least one processor; and
at least one memory including computer program code,
the at least one memory and the computer program code configured to, with the at least one processor, cause the apparatus to perform at least the following:
receiving a cell radio network temporary identifier indicating a semi-persistent scheduling; and
processing a reception of data with a new data indicator flag in accordance with said semi-persistent scheduling as:
a semi-persistent initial transmission that initializes one or more semi-persistent transmissions when a value of said new data indicator flag is equal to a first predefined value, and storing parameters when said new data indicator flag is equal to said first predefined value, wherein the one or more semi-persistent transmissions are received without physical downlink control channel according to the stored parameters and wherein the new data indicator flag does not toggle every time new data is received, and
a retransmission of semi-persistent scheduling data when said value of said new data indicator flag is equal to a second predefined value, wherein said second predefined value is different than said first predefined value; and
modifying said stored data in the data buffer depending on said value of said new data indicator flag.

2. The apparatus according to claim 1 wherein said first predefined value is zero and said second predefined value is one.

3. The apparatus according to claim 1 wherein said processor is configured to:
receive another cell radio network temporary identifier indicating a non-semi-persistent scheduling; and
treat another reception of data with another new data indicator flag in accordance with said non-semi-persistent scheduling as one of:
new data if a value of said another new data indicator flag is different than a value of a previously received new data indicator flag, and
retransmitted data if said value of said another new data indicator flag is equal to said value of said previously received new data indicator flag.

4. The apparatus according to claim 1, wherein said processor is configured to instruct said data buffer to modify said stored data by:
flushing said stored data when said value of said new data indicator flag is equal to said first predefined value, or if the one or more semi-persistent transmissions are received without physical downlink control channel, and
combining said stored data with said retransmission of the semi-persistent scheduling data when said value of said new data indicator flag is equal to said second predefined value.

5. The apparatus according to claim 1 wherein said new data indicator flag is provided in a physical downlink control channel.

6. A non-transitory computer-readable storage medium storing a computer program which when run on a computer, causes the computer to:
receiving a cell radio network temporary identifier indicating a semi-persistent scheduling; and
processing a reception of data with a new data indicator flag in accordance with said semi-persistent scheduling as:
semi-persistent initial transmission that initializes one or more semi-persistent transmissions when a value of said new data indicator flag is equal to a first predefined value, and storing parameters when said new data indicator flag is equal to said first predefined value, wherein the one or more semi-persistent transmissions are received without physical downlink control channel according to the stored parameters, and wherein the new data indicator flag does not toggle every time new data is received, and a retransmission of semi-persistent scheduling data when said value of said new data indicator flag is equal to a second predefined value, wherein said second predefined value is different than said first predefined value; and modifying stored data in a data buffer depending on said value of said new data indicator flag.

7. A method, comprising:

receiving a cell radio network temporary identifier indicating a semi-persistent scheduling; and processing a reception of data with a new data indicator flag in accordance with said semi-persistent scheduling as:

semi-persistent initial transmission that initializes one or more semi-persistent transmissions when a value of said new data indicator flag is equal to a first predefined value, and storing parameters when said new data indicator flag is equal to said first predefined value, wherein the one or more semi-persistent transmissions are received without physical downlink control channel according to the stored parameters, and wherein the new data indicator flag does not toggle every time new data is received, and a retransmission of semi-persistent scheduling data when said value of said new data indicator flag is equal to a second predefined value, wherein said second predefined value is different than said first predefined value; and modifying stored data in a data buffer depending on said value of said new data indicator flag.

8. An apparatus, comprising:

at least one processor; and at least one memory including computer program code, the at least one memory and the computer program code configured to, with the at least one processor, cause the apparatus to perform at least the following:

provide a cell radio network temporary identifier indicating a semi-persistent scheduling; and derive a new data indicator flag having:

a first predefined value for a semi-persistent initial transmission that initializes one or more semi-persistent transmissions, and provide parameters when said new data indicator flag is equal to said first predefined value, wherein the one or more semi-persistent transmissions are transmitted without physical downlink control channel according to the provided parameters, and wherein the new data indicator flag does not toggle every time new data is received, and a second predefined value for a retransmission of semi-persistent scheduling data, wherein said second predefined value is different than said first predefined value; and transmitting data with the derived new data indicator flag receivable by a user equipment for modifying data in a data buffer of the user equipment depending on the value of the new data indicator flag.

9. A method, comprising:

providing a cell radio network temporary identifier indicating a semi-persistent scheduling; and deriving a new data indicator flag having:

a first predefined value for semi-persistent initial transmission that initializes one or more semi-persistent transmissions, and providing parameters when said new data indicator flag is equal to said first predefined value, and wherein the one or more semi-persistent transmissions are transmitted without physical downlink control channel according to the provided parameters, and wherein the new data indicator flag does not toggle every time new data is received, and a second predefined value for a retransmission of semi-persistent scheduling data, wherein said second predefined value is different than said first predefined value; and transmitting data with the derived new data indicator flag receivable by a user equipment for modifying data in a data buffer of the user equipment depending on the value of the new data indicator flag.

10. An apparatus, comprising:

a data buffer for storing received data;

at least one processor; and at least one memory including computer program code, the at least one memory and the computer program code configured to, with the at least one processor, cause the apparatus to perform at least the following:

receiving a cell radio network temporary identifier indicating a semi-persistent scheduling; and treating a reception of data with a new data indicator flag in accordance with said semi-persistent scheduling as:

semi-persistent initial transmission that initializes one or more semi-persistent transmissions when a value of said new data indicator flag is equal to a first predefined value, and storing parameters when said new data indicator flag is equal to said first predefined value, wherein the one or more semi-persistent transmissions are received without physical downlink control channel according to the stored parameters, and wherein the new data indicator flag does not toggle every time new data is received, and a retransmission of semi-persistent scheduling data when said value of said new data indicator flag is equal to a second predefined value, wherein said second predefined value is different than said first predefined value;

receive another cell radio network temporary identifier indicating another semi-persistent scheduling or a non-semi-persistent scheduling; and if said another cell radio network temporary identifier indicates said another semi-persistent scheduling, treat another reception of data with another new data indicator flag in accordance with said semi-persistent scheduling as:

semi-persistent initial transmission that initializes one or more semi-persistent transmissions when a value of said another new data indicator flag is equal to a first predefined value, and a retransmission of semi-persistent scheduling data when said value of said another new data indicator flag is equal to a second predefined value, wherein said second predefined value is different than said first predefined value;

if said another cell radio network temporary identifier indicates a non-semi-persistent scheduling, treat another reception of data with another new data indicator flag in accordance with said non-semi-persistent scheduling as:

new data when a value of said another new data indicator flag is different than a value of a previously received new data indicator flag, and retransmitted data when said value of said another new data indicator flag is equal to said value of said previously received new data indicator flag; and modifying said stored data in the data buffer depending on said value of said new data indicator flag.

11. An apparatus according to claim 10, wherein the processor is configured to receive subsequent transmissions of data, if said subsequent transmissions of data are received without another new data indicator, assume the value of the new data indicator remains the same as the value of a most recent new data indicator;

if a new cell radio network temporary identifier indicating yet another semi-persistent scheduling is received, treating a reception of data with yet another new data indicator flag in accordance with said yet another semi-persistent scheduling as:

semi-persistent initial transmission that initializes one or more semi-persistent transmissions when a value of said yet another new data indicator flag is equal to a first predefined value, and a retransmission of the semi-persistent scheduling data when said value of said yet another new data indicator flag is equal to a second predefined value, wherein said second predefined value is different than said first predefined value that indicates an initial transmission of semi-persistent scheduling data, wherein the retransmission having said value of said new data indicator flag equal to said second predefined value is a retransmission of a previous semi-persistent scheduling data transmission.

12. The apparatus according to claim 1, wherein a subsequent initial transmission of semi-persistent scheduling data transmission is received without a new data indicator flag.

13. The non-transitory computer-readable storage medium according to claim 6, wherein a subsequent semi-persistent initial transmission is received without a new data indicator flag.

14. The method according to claim 7, wherein a subsequent semi-persistent initial transmission is received without a new data indicator flag.

15. The apparatus according to claim 8, wherein a subsequent semi-persistent initial transmission is received without a new data indicator flag.

16. The method according to claim 9, wherein a subsequent semi-persistent initial transmission is received without a new data indicator flag.

17. The apparatus according to claim 10, wherein a subsequent semi-persistent initial transmission is received without a new data indicator flag.

* * * * *